Aug. 18, 1942.   D. W. FENTRESS   2,293,247
WELDING METHOD AND APPARATUS
Filed Aug. 21, 1939   2 Sheets-Sheet 1
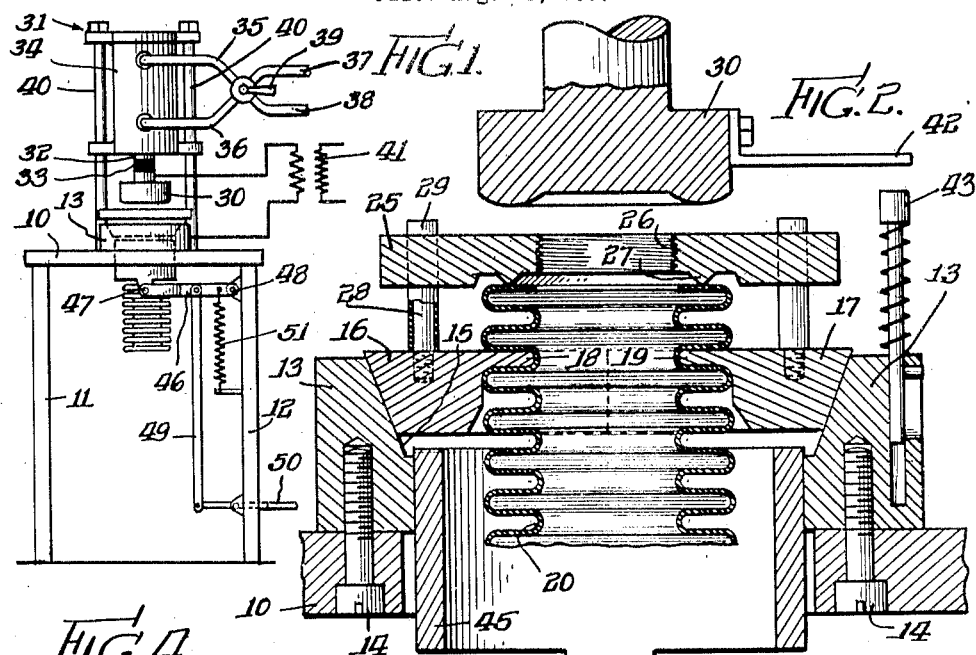
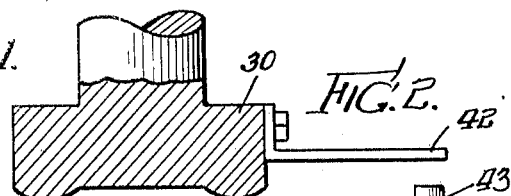
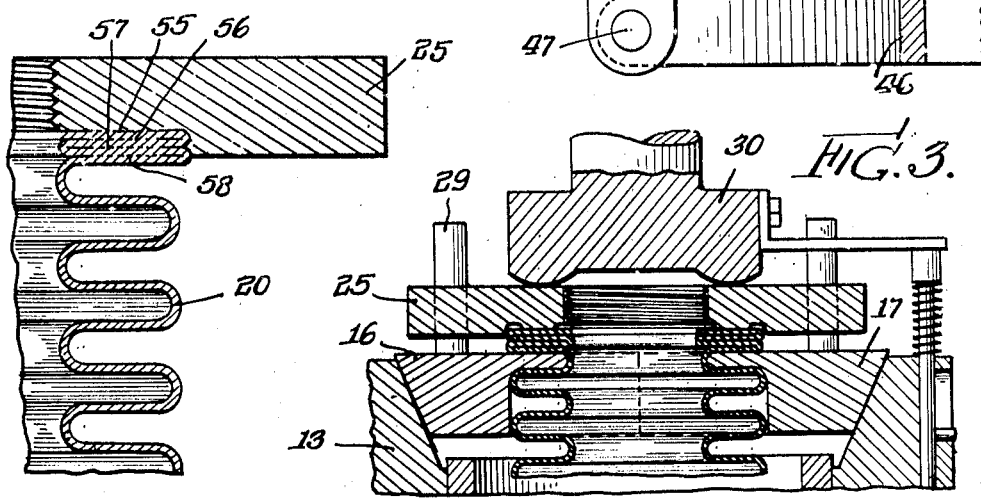
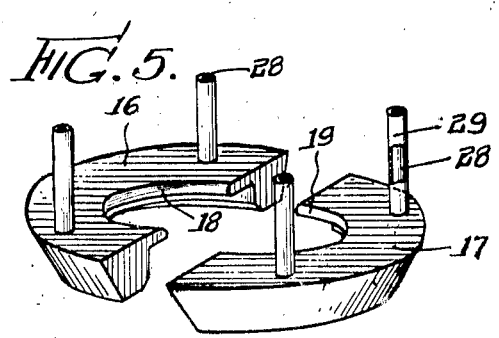
INVENTOR.
David Wendell Fentress
BY Cox & Moore
ATTORNEYS.

Aug. 18, 1942.          D. W. FENTRESS          2,293,247
                WELDING METHOD AND APPARATUS
                  Filed Aug. 21, 1939         2 Sheets-Sheet 2
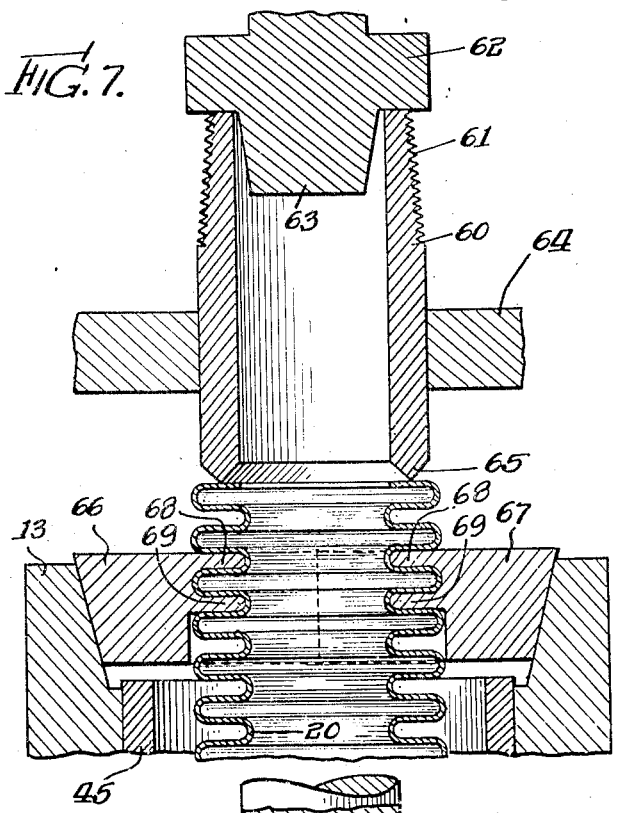
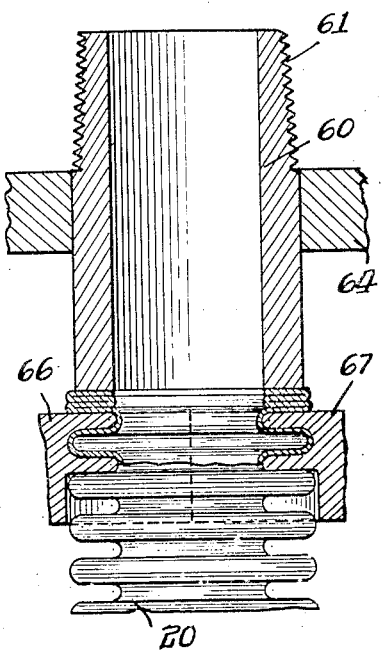
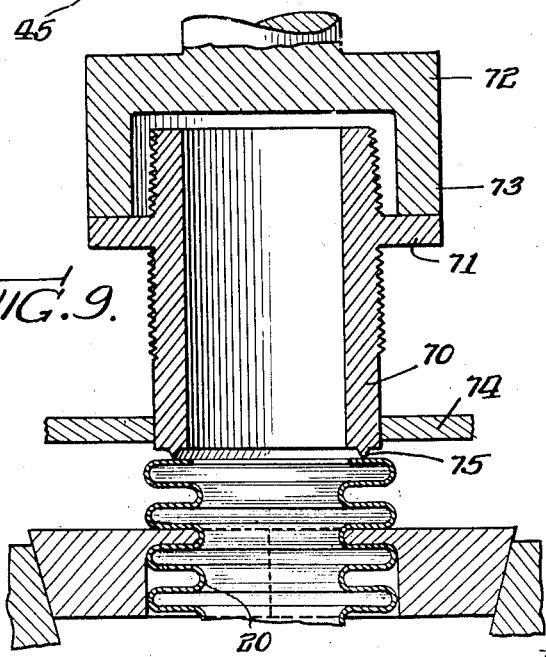
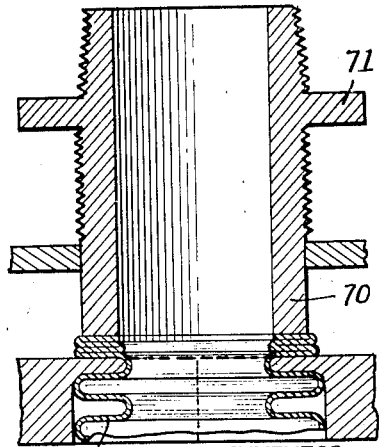
INVENTOR.
David Wendell Fentress
BY Cox & Moore
ATTORNEYS.

Patented Aug. 18, 1942

2,293,247

UNITED STATES PATENT OFFICE 2,293,247

WELDING METHOD AND APPARATUS

David Wendell Fentress, Hubbard Woods, Ill., assignor to Chicago Metal Hose Corporation, Maywood, Ill., a corporation of Illinois Application August 21, 1939, Serial No. 291,141

11 Claims. (Cl. 219—4)

This invention relates to welding methods and apparatus, particularly for use in securing coupling connections or fittings to metal hose.

It is a primary object of the invention to provide methods and means for securing coupling members and fittings to metal hose, particularly of the flexible type, by means of projection welding.

It is a further object of the invention to provide methods and means for securing couplings or fittings to metal hose which are rapid and accurate in operation and which eliminate the difficulties encountered in the making and use of brazed or soldered joints.

Further objects of the invention are to provide a fluid-tight, strong, heat resistant, and chemically resistant connection between a metal hose and a coupling or fitting member; and to provide for the securing of the coupling or fitting to the hose by means of a single operation which both effects the securing operation and conditions the parts therefor.

A still further object of the invention is to provide for the welding of a coupling connection or fitting to a piece of metal hose without the application of undue heat, whereby to prevent the annealing or rupture of the metal fibers in the coupling or hose member parts.

Other objects, advantages, and features of the invention will appear from the following specification when taken in connection with the accompanying drawings wherein certain preferred embodiments of the invention are set forth for purposes of illustration.

In the drawings, wherein like reference numerals refer to like parts throughout:

Figure 1 is a general assembly view, somewhat diagrammatic in form, illustrating a welding apparatus constructed in accordance with the principles of the invention and embodying the means thereof;

Fig. 2 is a partial detailed view on an enlarged scale of the apparatus shown in Fig. 1, particularly illustrating the welding electrodes and associated parts;

Fig. 3 is a view similar to Fig. 2 but showing the position of the parts after the partial completion of the operating stroke;

Fig. 4 is a partial detailed view more particularly illustrating the completed welded joint;

Fig. 5 is a perspective detail showing one of the electrode members adapted to clampingly embrace the tubing or metal hose;

Fig. 6 is an elevation view illustrating the hose with the coupling connection applied thereto;

Figs. 7 and 8 illustrate successive method steps in a modified form of the invention; and Figs. 9 and 10 show similar successive steps in a further modified form of structure.

Referring more particularly to the drawings, and first to Figs. 1 to 6, inclusive, the welding apparatus illustrated comprises a main base frame 10 adapted to be supported by legs 11 and 12. The main frame 10 carries a socket support member 13 which is preferably in the form of a continuous annular ring, the support member being adapted to be secured to the frame by any suitable securing means, such as the bolts or screws 14. A split ring electrode, the construction of which is best shown in Fig. 5, is adapted to fit into the tapered opening 15 formed in the upper face of the support member 13, the split ring electrode comprising a pair of complementary ring portions 16 and 17 adapted, when in contacting or assembled relation, to form a complete ring or annulus structure. The electrode ring members 16 and 17 are provided with flange portions 18 and 19, respectively, which, when the ring members are in assembled position, form a complete annular flange adapted to extend into interlocking engagement with an annular convolution of the tubing 20.

In the particular embodiment of the invention set forth for purposes of illustration, the tubing 20 to which the coupling or fitting is to be welded is illustrated as being of the annular convoluted type. It is to be understood, however, that the invention and the principles thereof may be adapted for use with various types of tubing other than the specific form illustrated. For example, if the tubing were of the helically convoluted type, the holding flanges 18 and 19 of the split ring electrodes would be of helical character of a pitch equal to that of the tubing convolutions, whereby to permit an interlocking engagement therewith. The flanges 18 and 19, in extending into interlocking engagement with the tubing convolutions, form a firm supporting means for the tubing whereby to hold the tubing in position for welding, as well as during the welding operation, as will be later more specifically described.

The coupling or fitting 25, which is adapted to be secured to the end of the tubing or metal hose by the welding operation, may be of any suitable form or character. As illustrated (Fig. 2), it comprises an annular ring or flange provided with an internal threaded bore 26. The coupling is also provided with an annular bead or sharp-pointed projection 27 which may be turned or otherwise formed upon the coupling body. In the initial assembly of the parts, the point of the projection lies upon the end face of the tubing as best illustrated in Fig. 2. The coupling body is held in position relative to the tubing end by means of a series of upstanding posts 28 carried by the split ring electrode. These posts are encased in hard rubber sleeves 29 for insulation purposes, as will be later described.

The upper electrode 30, which engages and forces the coupling member 25 downwardly during the welding operation, is formed as a part of a hydraulic cylinder and piston construction or actuator, generally indicated by the reference numeral 31 (Fig. 1). More specifically, the electrode 30 is formed on the end of a piston rod 32, the electrode being electrically insulated from the piston rod by means of suitable insulation 33. The piston rod is adapted to be vertically reciprocated within the cylinder 34 by hydraulic means, and to this end the cylinder is provided with hydraulic conduits 35 and 36 leading to the upper and lower ends thereof, these conduits being adapted to be connected to a hydraulic fluid pressure supply line 37 and an exhaust line 38 under control of a four-way valve 39. The hydraulic actuator 31 and the associated control valve 39 may be of any suitable construction, so that when the control valve is moved to one position of operation the pressure supply line 37, leading from a source of fluid under pressure, is connected to the conduit 35 leading within the cylinder to a point above the actuator piston for the piston rod 32, and the conduit 36, connected to the cylinder at a point below the actuator piston, is connected to the exhaust line 38. In this position of the valve, the piston rod 32 and its associated electrode 30 will be forced downwardly under hydraulic pressure. When the control valve 39 is moved to another operating position, the conduit 36 is connected to the supply line 37 and the conduit 35 is connected to the exhaust line 38, whereby to reverse the hydraulic operation and raise the piston rod. In view of the fact that the lowering movement of the plunger should be relatively fast, in many instances it will be desirable to operate the piston and cylinder actuator from compressed air, in which case the supply line 37 is connected to a suitable compressed air supply. The hydraulic actuator and its associated parts may be supported upon the main frame 10 by suitable means, such as the support posts 40.

As diagrammatically indicated in Fig. 1, the upper or plunger electrode 30 is adapted to be electrically connected to one branch of the secondary of a suitable welding transformer, generally indicated by the reference numeral 41, the other branch of the transformer secondary being electrically connected to the lower or ring electrode through the intermediary of the support structure 13. As best shown in Fig. 2, the upper electrode is provided with a projecting pin or the like 42 which, when the electrode reaches a predetermined position in its downward movement, actuates a switch 43 carried by the support member 13. The switch 43 is adapted to control the transmission of the welding current through the welding transformer 41 whereby to control the closing and opening of the welding circuit in timed relation with the movement of the plunger or pressure electrode 30.

Means is provided for facilitating the removal of the split ring electrode from the support 13 at the end of the welding operation. This means comprises a sleeve member 45 reciprocable within an opening in the main frame 10 and adapted on upward movement to engage the split ring electrode and eject the same upwardly and outwardly from the support 13. The ejector member 45 is in sleeve form, whereby to loosely embrace and not interfere with the tubing 20. The ejector sleeve is adapted to be operated by a forked yoke 46 pivotally connected at one end to the ejector sleeve, as indicated at 47, and pivoted at its other end to the frame leg structure 12, as indicated at 48. The yoke is operated by a link 49 pivotally connected to a foot treadle or operating lever 50. A spring 51 normally urges the ejector sleeve into its lower position as shown in Fig. 2.

In the operation of the apparatus and to effect the welding operation, the split ring electrode is first mounted upon the flexible tubing, the flanges 18 and 19 being brought into engagement with a convolution once or twice removed from the end of the tubing, so that a predetermined length of tubing will extend beyond the end of the split ring electrode. The electrode with the tubing mounted therein is then inserted or dropped into the conical support member 13, the support member acting to firmly hold the electrode ring in gripping engagement with the tubing. The coupling member 25 is then dropped into position between the guide pins 28, the pointed projection 27 of the coupling being brought into contacting relation with the upper face of the tubing. The control valve 39 is then operated to effect the hydraulic depression of the plunger electrode 30. As the plunger electrode engages and forces the coupling member 25 downwardly, the end convolutions of the tubing will be compressed or collapsed as shown in Fig. 3, and at a predetermined point in the downward movement of the plunger electrode, the pin 42 will strike the switch 43 initiating the transmission of the welding current. The welding current is transmitted between the electrode 30 and the ring electrode 16, 17 through the coupling member 25, the projection rib 27, and the tubing 20, the current being prevented from passing directly from the coupling member to the ring electrode through the guide pins 28 by reason of the insulation sleeves 29.

Due to the small area of contact between the pointed projection 27 and the end of the tubing, the resistance and heating occurs at this point of contact resulting in the production of a firm welded joint in accordance with the principles of projection welding. Due to the fact that the rib or projection 27 is annular, a complete annular sealing weld will be produced. The pressure between the coupling member and the tubing, coupled with the heating at the welded joint, results in the melting or dissipation of the rib 27 so that the completed welded joint assumes the condition illustrated in Fig. 4. Not only will the coupling member be welded to the tubing end, as indicated at 55, but the several superimposed and contacting convolutions of the tubing will also be partially welded to each other as indicated at 56, 57, and 58, thereby producing a substantially rigid metal mass forming a firm and strong joint between the coupling or fitting and the tubing end.

When the welding operation has been completed, the control valve 39 is manipulated to cause the raising or withdrawal of the plunger electrode, which also results in the breaking of the welding current circuit. It is to be understood, however, that the welding current may remain active, if desired, only during the initial downward movement of the plunger, the current being shut off toward the end of the downward stroke of the plunger whereby to permit the plunger to compress the rib 27 after the heating thereof to complete the weld, but without the simultaneous application of current. The switch 43 may be arranged to effect any desired mode of operation. The operator may then facilitate the removal of the split ring electrode and the welded tubing from the support 13 by manipulation of the foot lever 50. Downward movement of the foot lever causes the ejector sleeve 45 to be raised into engagement with the electrode, striking the same and breaking it loose from the holder 13. The tubing and coupling, now welded into a single unit as illustrated in Fig. 6, may be readily removed from the split ring electrode by the separation of the electrode parts.

It will be seen that the invention provides means and methods for applying the principles of projection welding to the securing of couplings or fittings to metal tubing or hose. A strong joint is produced which is fluid-tight even as to gases under pressure and the most searching liquids, the joint extending peripherally of the tubing, forming a complete welded seal. The welded joint, being formed of the tubing and coupling metal, affords greater resistance to heat than would be afforded by a soldered or brazed joint, and the joint is chemically resistant to various fluids which attack or affect brazed or soldered connections. The complete connection is made by a single operation which both conditions the tubing for connection to the coupling and effects the welding operation. The operation may be rapidly and accurately carried out by relatively unskilled operators and yet a uniform proper welded joint is assured. The projection welding and the speed of the operation provide for a minimum of heating of the tubing and coupling parts, thus minimizing the annealing and metal breakdown effects imparted by the application of an undue amount of heat to the welded structures.

Various kinds of tubing and couplings or fittings may be utilized, made of various kinds of metal, like or unlike, suitable for electrical resistance welding. For example, the invention is well adapted to the welding of steel tubing, including stainless steel tubing. It is to be understood that the electrodes will be made of suitable electrode material, such as copper or copper alloy. Obviously, various means may be employed for effecting the reciprocation of the plunger electrode 30, manual or automatic.

An embodiment of the invention is illustrated in Figs. 7 and 8, showing a means for securing a different type of coupling to the tubing end and also incorporating certain other modified features of construction. In this instance, the coupling 60, to be secured to the tubing end, is in the form of an elongated sleeve externally threaded as indicated at 61. The plunger electrode 62, which functions in a manner similar to the plunger electrode previously described, is of somewhat different shape, being provided with a projection portion 63 which serves as a guide or holder for the end of the coupling. Additional guide means in the form of a perforated plate 64 is provided for guiding the coupling member in its downward movement, the guide plate being suitably insulated in any desired manner so as to enforce the passage of the welding current through the coupling and tubing, as previously described.

The welding projection or rib 65 is in this instance formed, as illustrated, circumferentially of the bottom edge of the coupling, the rib being turned or otherwise suitably formed. The two parts 66 and 67 of the split ring electrode are in this instance provided with double flange portions 68 and 69, whereby to provide an increased measure of support to the tubing and also to provide greater resistance to the shearing action induced by the downward movement of the plunger electrode. The parts and apparatus are otherwise substantially similar to the embodiment previously described and the operation is the same. Fig. 7 illustrates the parts in initial position at the beginning of the welding operation, and Fig. 8 shows the position of the parts after the completion of the welded joint.

In Figs. 9 and 10 a further modified form of the invention is illustrated, the coupling 70 to be welded to the tubing in this instance being provided with a laterally-extending flange 71. The plunger electrode 72 is provided with an annular skirt portion 73 embracing the coupling and engaging the flange 71. The skirt serves as a means for holding the coupling in proper position. A guide plate 74, similar to the guide plate 64 previously described in reference to Figs. 7 and 8, may also be provided. The projection welding rib 75 is in this instance relatively small and is suitably formed by the end of the coupling. Fig. 9 shows the position of the parts at the beginning of the operation, and Fig. 10 illustrates the parts after the welding operation.

It is obvious that various changes may be made in the specific embodiments of the invention set forth for purposes of illustration and in the various method steps described, without departing from the spirit of the invention. The invention is accordingly not to be limited to the precise embodiments and method steps shown, but only as indicated in the following claims.

The invention is hereby claimed as follows:

1. The method of welding a fitting to convoluted metal tubing, which comprises forming a projection on the fitting, engaging the projection against a side wall of a piece of convoluted metal tubing, and passing welding current between the fitting and tubing through a localized area while pressing the projection into engagement with said wall of the tubing, and pressing the opposed side walls of at least the first convolution of the tubing adjacent the fitting together whereby to form a projection weld.

2. The method of welding a fitting to convoluted metal tubing, which comprises forming an annular rib of triangular transverse cross-section with an apex of the triangle outermost on the fitting member, engaging the annular rib against a side wall of a piece of convoluted metal tubing, and passing welding current between the fitting and the tubing through a localized area between the fitting and the tubing through their points of contact while pressing the annular rib into such firm engagement with the tubing as to press together the opposed side walls of at least the first convolution of the tubing adjacent the fitting whereby to form an annular projection weld.

3. The method of welding a fitting to convoluted metal tubing, which comprises forming an annular rib on the fitting member, engaging the annular rib against a side wall of a piece of convoluted metal tubing, and passing welding current between the fitting and the tubing through a localized area between the fitting and the tubing through their points of contact while pressing the annular rib into engagement with said wall of the tubing, and pressing the opposed side walls of at least the two convolutions of the tubing adjacent the fitting together whereby to form an annular projection weld.

4. An apparatus for welding a fitting to convoluted metal tubing, comprising means for holding a wall of a piece of convoluted metal tubing in engagement with a fitting having a projection, said means including flange means adapted to project between a pair of adjacent convolutions, means for pressing the fitting projection firmly against said wall of the tubing, and means for passing welding current between the fitting and the tubing through a localized area while the projection is so pressed firmly against said wall of the tubing whereby to form a projection weld between the fitting and the tubing.

5. An apparatus for welding a fitting to convoluted metal tubing, comprising means for holding a wall of a piece of convoluted metal tubing in engagement with a fitting having an annular projection, said means including flange means adapted to project between a pair of adjacent convolutions, a plunger for forcing the fitting projection firmly against said wall of the tubing, and means for passing welding current between the fitting and the tubing through a localized area while the projection is so pressed firmly against said wall of the tubing whereby to form a projection weld between the fitting and the tubing.

6. An apparatus for welding a fitting to convoluted metal tubing, comprising means for holding a wall of a piece of convoluted metal tubing in engagement with a fitting having an annular projection, said means including flange means adapted to project between a pair of adjacent convolutions, and said means being adapted to support the convoluted metal tubing with a convolution between said flange means and said projection, a plunger adapted to engage the fitting, means for operating the plunger to force the fitting projection firmly against the engaged wall of the tubing with sufficient force to collapse the tubing convolution between the projection and said flange means, and means for passing welding current between the fitting and the tubing through a localized area while the projection is so forced firmly against said wall of the tubing whereby to form a projection weld between the fitting and the tubing.

7. An apparatus for welding a fitting to convoluted metal tubing, comprising means for holding a wall of a piece of convoluted metal tubing in engagement with a fitting having an annular projection, said means including a split ring holder provided with flange means adapted to lie in interlocking engagement with the convolutions of the tubing, a plunger arranged to force the fitting projection and the tubing into firm engaging contact, and means for passing welding current between the fitting and the tubing through a localized area while the projection is held in engagement with the tubing whereby to form an annular projection weld between the fitting and the tubing.

8. An apparatus for welding a fitting to convoluted metal tubing, comprising means for holding a wall of a piece of convoluted metal tubing in engagement with a fitting having an annular projection, said means including a split ring holder provided with flange means adapted to lie into interlocking engagement with the convolutions of the tubing, a plunger arranged to act on the fitting to force the fitting projection into firm engaging contact with said wall of the tubing, and means for passing welding current between the fitting and the tubing through a localized area including as cooperating electrodes the split ring holder and the plunger, said welding current being passed between the fitting and the tubing while the projection is held in engagement with the tubing whereby to form an annular projection weld between the fitting and the tubing.

9. An apparatus for welding a fitting to metal tubing, comprising an annular support member, a split ring holder supported thereby adapted to embrace a piece of metal tubing and hold the same, guide means on the split ring holder for holding a fitting having an annular projection with the projection in engagement with the tubing, a fluid operated plunger engageable with the fitting for forcing the fitting projection into firm engaging contact with the tubing, and means for passing welding current between the fitting and the tubing through a localized area while the projection is held in engagement with the tubing whereby to form an annular projection weld between the fitting and the tubing.

10. An apparatus as defined in claim 9, wherein ejector means is provided engageable with the split ring holder for ejecting the same from the annular support member, and wherein means is provided for operating the ejector member.

11. An apparatus for welding a fitting to convoluted metal tubing, comprising means for holding the end side wall of a piece of convoluted metal tubing in engagement with a fitting having an annular projection, said means including flange means adapted to project between a pair of adjacent tubing convolutions and shaped generally to the contour thereof, means for pressing the fitting projection firmly against said wall of the tubing, and means for passing welding current between the fitting and the tubing through a localized area while the projection is so pressed firmly against said wall of the tubing whereby to form a projection weld between the fitting and the tubing.

DAVID WENDELL FENTRESS.